(12) United States Patent
Chung et al.

(10) Patent No.: US 7,719,614 B2
(45) Date of Patent: May 18, 2010

(54) APPARATUS AND METHOD FOR CONVERTING FRAME RATE WITHOUT EXTERNAL MEMORY IN DISPLAY SYSTEM

(75) Inventors: Hwe-ihn Chung, Seongnam-si (KR);
Sang-ha Hwang, Osan-si (KR);
Byeong-du La, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1251 days.

(21) Appl. No.: 11/248,457

(22) Filed: Oct. 12, 2005

(65) Prior Publication Data
US 2006/0077290 A1 Apr. 13, 2006

(30) Foreign Application Priority Data
Oct. 13, 2004 (KR) ............... 10-2004-0081754

(51) Int. Cl.
*H04N 11/20* (2006.01)
(52) U.S. Cl. .................. 348/441; 348/459; 345/213
(58) Field of Classification Search .......... 348/441, 348/459, 700, 701, 525, 526, 529, 536, 547, 348/550; 345/213, 87
See application file for complete search history.

(56) References Cited

U.S. PATENT DOCUMENTS

| | | | | |
|---|---|---|---|---|
| 5,168,362 A | * | 12/1992 | Yoshida | 348/696 |
| 5,638,467 A | * | 6/1997 | Chua et al. | 382/298 |
| 5,835,150 A | * | 11/1998 | Choi | 348/441 |
| 5,963,187 A | * | 10/1999 | Tanaka et al. | 345/97 |
| 6,177,922 B1 | * | 1/2001 | Schiefer et al. | 345/698 |
| 6,181,382 B1 | * | 1/2001 | Kieu et al. | 348/459 |
| 6,300,964 B1 | * | 10/2001 | Intihar | 345/574 |
| 6,441,813 B1 | * | 8/2002 | Ishibashi | 345/213 |
| 6,970,163 B2 | * | 11/2005 | Cairns et al. | 345/213 |
| 7,268,825 B2 | * | 9/2007 | Ciardi | 348/512 |
| 2005/0060421 A1 | * | 3/2005 | Musunuri et al. | 709/231 |
| 2005/0162367 A1 | * | 7/2005 | Kobayashi et al. | 345/98 |

FOREIGN PATENT DOCUMENTS

| | | |
|---|---|---|
| JP | 11-338424 | 12/1999 |
| JP | 2004-048530 | 2/2004 |
| JP | 10-2004-0064943 | 7/2004 |

* cited by examiner

*Primary Examiner*—Victor Kostak
(74) *Attorney, Agent, or Firm*—Mills & Onello, LLP (57) ABSTRACT

In an apparatus and method for converting the frame rate of an image signal in a display system without an external memory, the display system and method are capable of down converting the frame rate of an image signal using a frame rate conversion unit without an external memory. The system and method can be used even in the case where the frequencies of input and output synchronization signals are locked to the same frame rate. The frame rate conversion unit disable-masks portions of the frames of a data enable signal or a vertical synchronization signal, thus canceling the portions of the frames, and outputs the masked data enable signal or the masked vertical synchronization signal to an LCD driving circuit unit, thereby down converting the frame rate of the image signal.

18 Claims, 7 Drawing Sheets

APPARATUS AND METHOD FOR CONVERTING FRAME RATE WITHOUT EXTERNAL MEMORY IN DISPLAY SYSTEM

CROSS-REFERENCE TO RELATED PATENT APPLICATIONS

This application claims the priority of Korean Patent Application No. 10-2004-0081754, filed on Oct. 13, 2004 in the Korean Intellectual Property Office, the disclosure of which is incorporated herein in its entirety by reference.

BACKGROUND OF THE INVENTION

1. Field of the Invention

The present invention relates to a display system, and more particularly, to a frame rate conversion apparatus and method.

2. Description of the Related Art

In general, a display system, such as a liquid crystal display (LCD) monitor, displays an image at a vertical frequency or frame rate of 60±5 KHz. Since image signals are input at various frame rates, the display system converts the frames of the image signals into frame rates that are permitted by a particular display device, such as an LCD panel. The display system performs frame rate down conversion on the input image signal when the frame rate of an input image signal is greater than permitted in the display device, and performs frame rate up conversion otherwise. Unlike a signal output by a video player or a TV signal, the frame rate of a signal output by a graphic card of a computer is likely to be greater than the frame rate required by the display device such as an LCD panel. Thus, the display system requires an apparatus that performs frame rate down conversion. Since advancement in technologies increases the frame rate permitted in the display device such as the LCD panel, the need for frame rate conversion continues to become reduced. Nonetheless, frame rate conversion is still required to display signals with various frame rates on a display device.

Figure 1:
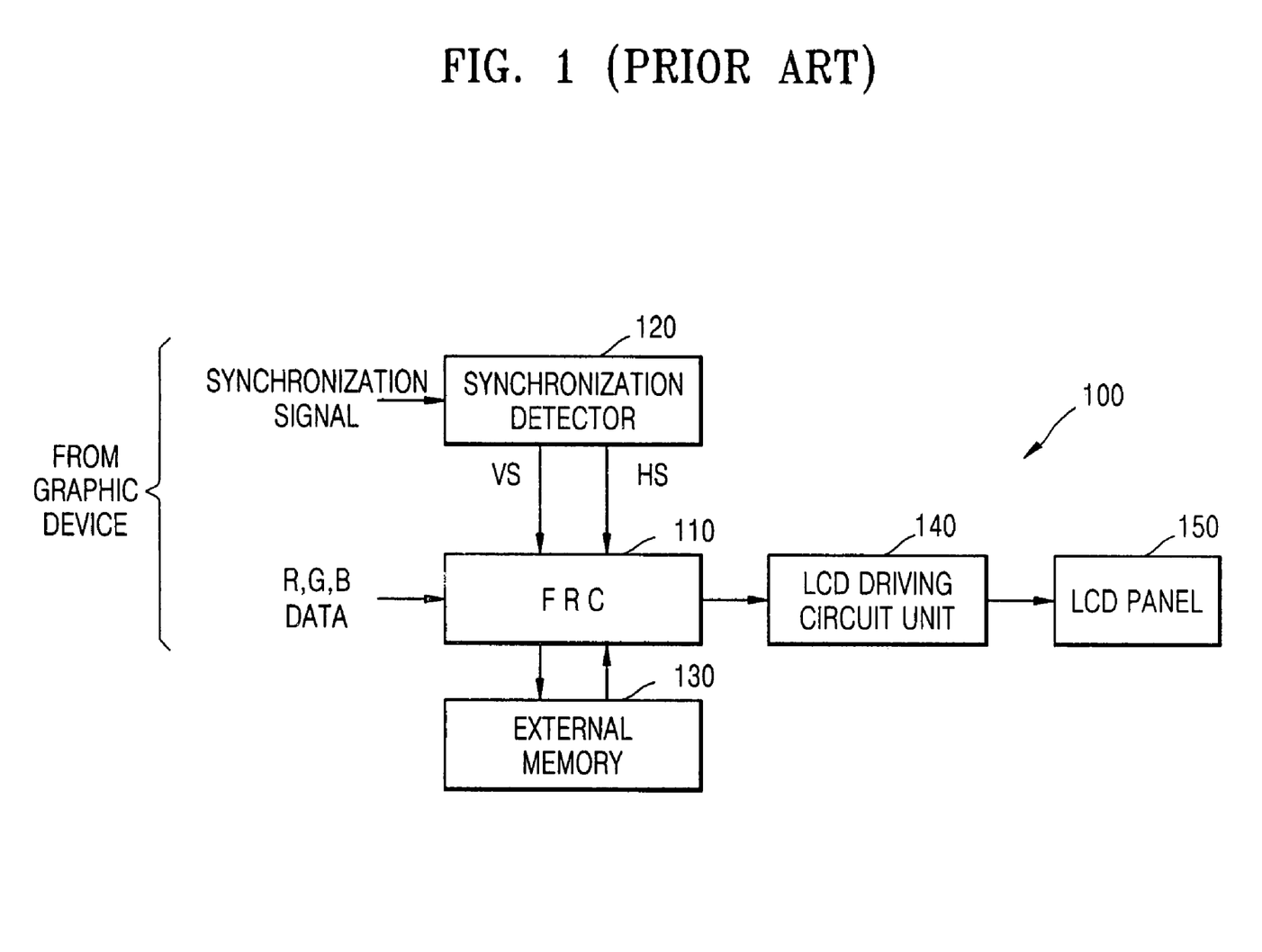
FIG. 1 is a block diagram of a conventional LCD system with a frame rate conversion function.

FIG. 1 is a block diagram of a conventional LCD system 100 with a frame rate conversion function. The LCD system 100 includes a frame rate conversion unit 110, a synchronization detector 120, an external memory 130, an LCD driving circuit unit 140, and an LCD panel 150. When a three color signal, i.e., R (Red), G (Green), and B (Blue) image data, and a synchronization signal output from an external device such as a graphic device are input to the LCD system 100, the frame rate conversion unit 110 converts the frame rates of the R, G, B data using the external memory 130. When the converted R, G, B data is input to the LCD driving circuit unit 140, the LCD driving circuit unit 140 processes the converted R, G, B data to be displayed on the LCD panel 150.

Figure 2:
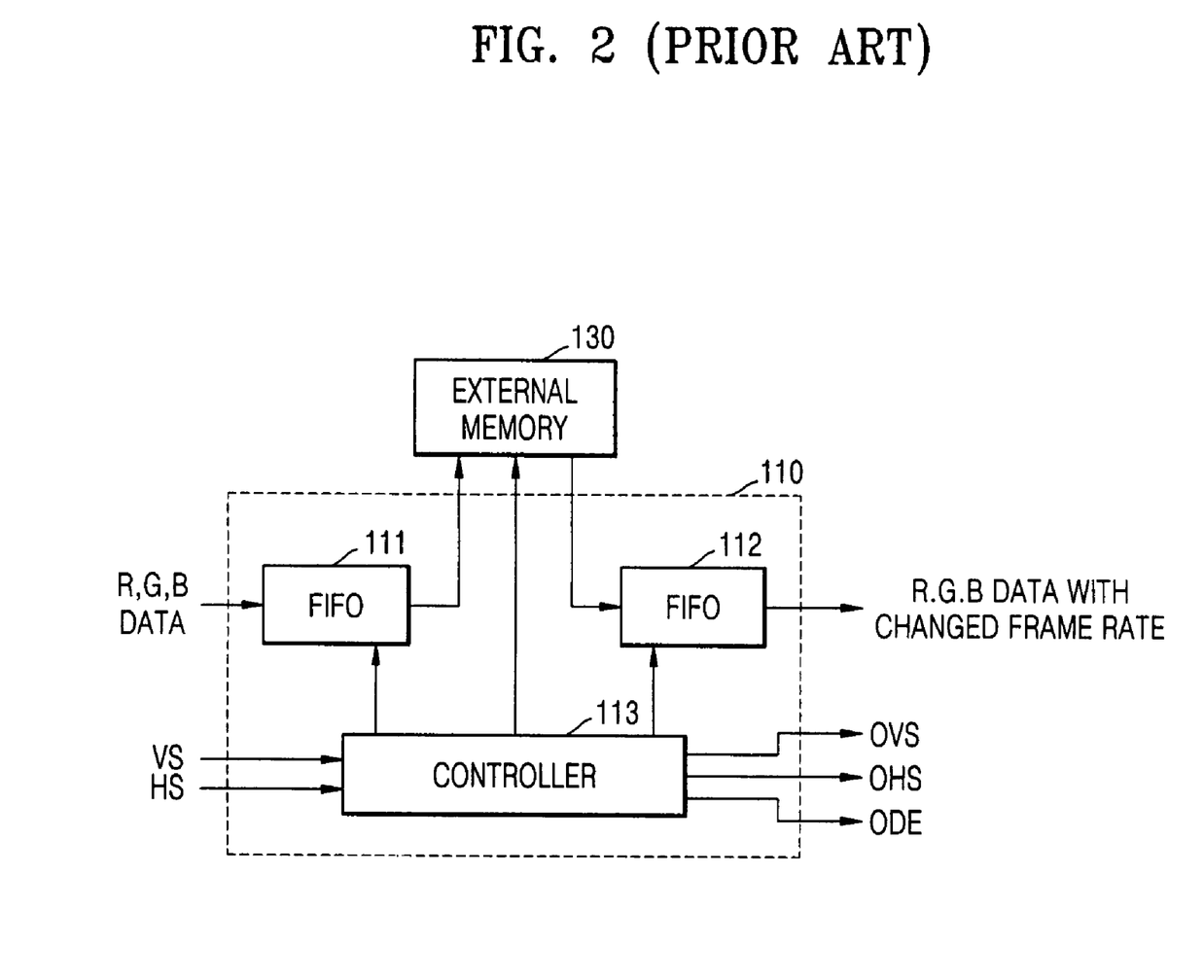
FIG. 2 is a detailed block diagram of the frame rate conversion unit of FIG. 1.

FIG. 2 is a detailed block diagram of the frame rate conversion unit 110 of FIG. 1. Referring to FIG. 2, the frame rate conversion unit 110 includes a First In First Out (FIFO) memory 111, a second FIFO memory 112, and a controller 113. When the R, G, B data output from the external device is sequentially input to the first FIFO memory 111, the external memory 130, and the second FIFO memory 112, the frame rate of the R, G, B data is converted into a frame rate required by the LCD panel 150 and the converted R, G, B data is input to the LCD driving circuit unit 140. The controller 113 controls input of data to and output of data from the first FIFO memory 111, the external memory 130, and the second FIFO memory 112, using an input vertical synchronization signal VS and an input horizontal synchronization signal HS detected by the synchronization detector 120. The controller 113 also generates an output vertical synchronization signal OVS, an output horizontal synchronization signal OHS, and an output data enable signal ODE whose frame rates are sufficient to drive the LCD panel 150, and outputs them to the LCD driving circuit unit 140.

As described above, since the frequencies of the output synchronization signals OVS and OHS are different from those of the synchronization signals VS and HS input from an external device. The frame rate of image data input outside the LCD system 100 has been converted. In this case, only when the output data enable signal ODE is at a logic high level, the LCD driving circuit unit 140 outputs the image data to the LCD panel 150 so that the image data is displayed on the LCD panel 150.

Figure 3:
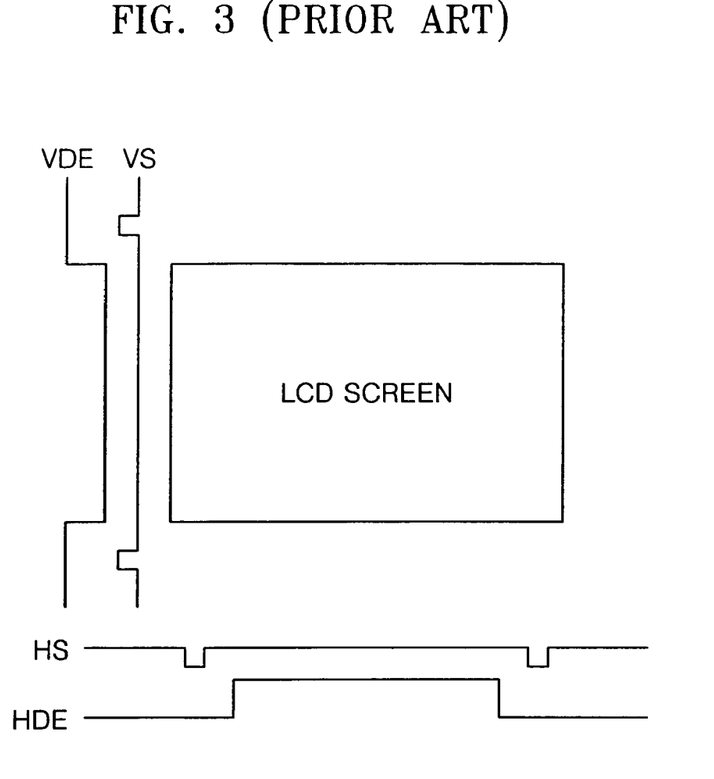
FIG. 3 is a diagram illustrating the relationship among synchronization signals and data enable signals.
Figure 4:
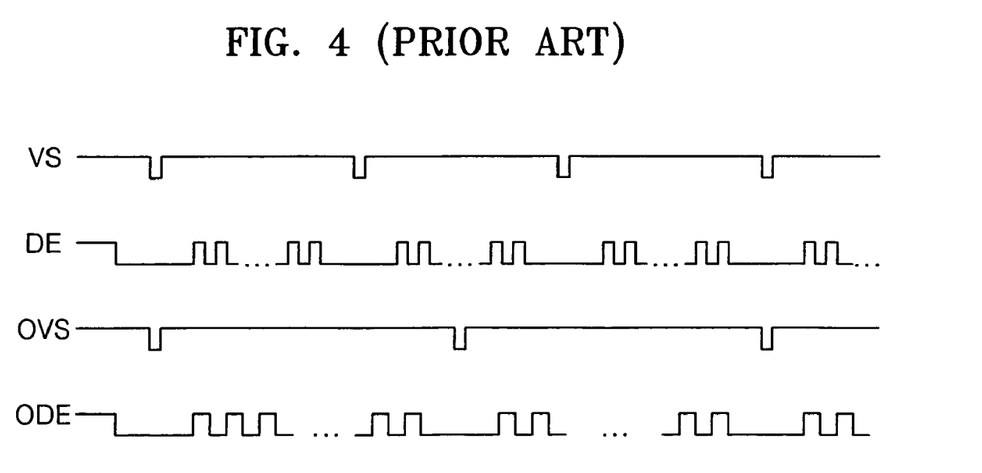
FIG. 4 is a timing diagram of synchronization signals and data enable signals output from the frame rate conversion unit of FIG. 1.
Figure 5:
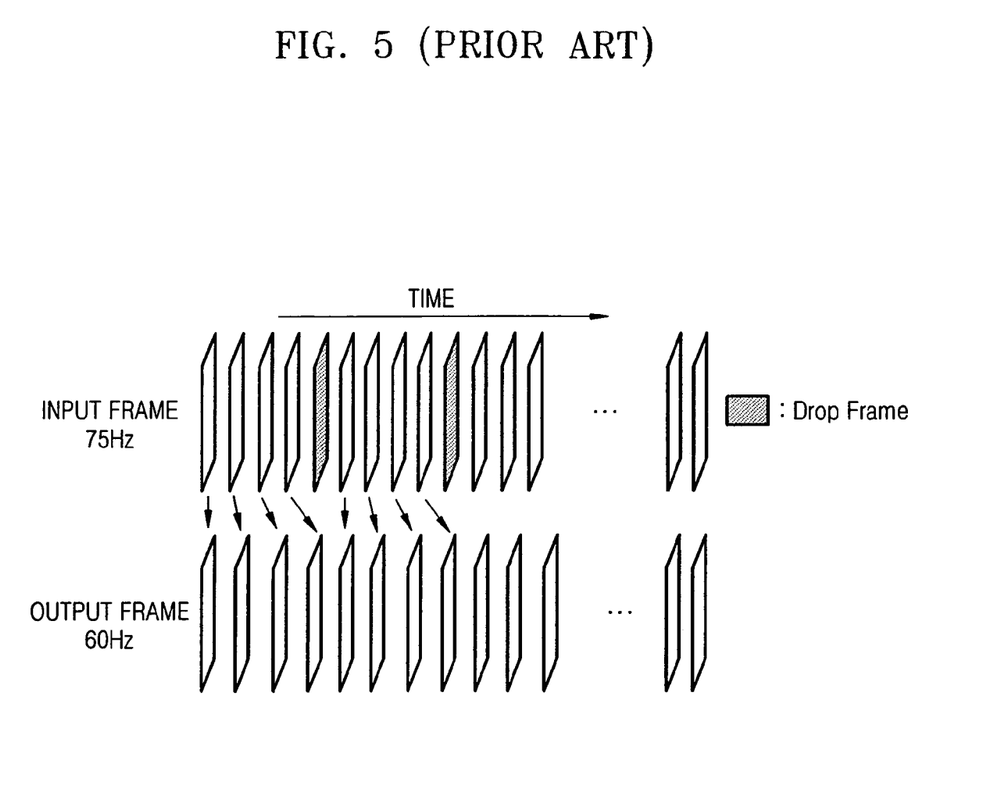
FIG. 5 is a diagram illustrating a method of rejecting some of frame rates using the frame rate conversion unit of FIG. 1.

FIG. 3 illustrates the relationship among the input synchronization signals VS and HS and vertical and horizontal data enable signals VDE and HDE. Referring to FIG. 3, an image is displayed on the LCD panel 150 when both the vertical data enable signal VDE and the horizontal data enable signal HDE are at a logic high level. The period of the vertical data enable signal VDE is shorter than that of the vertical synchronization signal VS, and the period of the horizontal data enable signal HDE is shorter than that of the horizontal synchronization signal HS. In other words, an output data enable signal DE shown in FIG. 4 goes high when both the vertical data enable signal VDE and the horizontal data enable signal HDE are at a logic high, and an image is displayed on the LCD panel 150 when the LCD driving circuit unit 140 operates in response to the high-level output data enable signal DE. FIG. 4 is a timing diagram illustrating the relationship among the vertical synchronization signals VS and OVS and the data enable signals DE and ODE generated before and after frame rate down conversion is performed. Referring to FIG. 4, the period of the output vertical synchronization signal OVS is longer than that of the input vertical synchronization signal VS. Thus, frame rate down conversion must be performed by decimating or interpolating parts of the frames of input signals to control the frame rates of output signals. For instance, when the frequency of an input frame is 75 Hz and the frequency of an output frame is 60 Hz, one of every five frames must be rejected as shown in FIG. 5.

As described above, conventional frame rate conversion requires the external memory 130, and the FIFO memories 111 and 112 and the controller 113 to drive the external memory 130. Accordingly, an LCD system 100 with a frame rate conversion function has a complicated circuit construction and is expensive to manufacture. Such problems also occur in a low-price display system that performs only frame rate down conversion to realize a Picture-In-Picture (PIP) function; and a multi-sync system that performs frame rate down/up conversion on signals with various frame rates, e.g., a signal output from a graphic card of a computer, a signal output from a video player, and a TV signal, and displays these signals. For instance, in order to display a PIP screen with a frame rate of 60 Hz in a screen with a frame rate of 75 Hz, the frame rate of a part of the screen with the frame rate of 75 Hz may be converted down to the frame rate of 60 Hz.

SUMMARY OF THE INVENTION

The present invention provides an apparatus capable of performing frame rate down conversion in display systems, and even in a display system in which a frame rate is locked, i.e., where the frequency of an input synchronization signal is equivalent to that of an output synchronization signal, without the need for an external memory.

The present invention also provides a method of performing frame rate down conversion in display systems, and even in a display system in which a frame rate is locked, without the need for an external memory.

In one aspect of the present invention, a frame rate conversion apparatus is provided comprising: a frame counter that generates a frame count signal from a vertical synchronization signal; a frame calculator that generates a masking enable signal using the frame count signal; and an enable signal generator that outputs a masked data enable signal by disable-masking a frame of every several frames of a data enable signal in response to the masking enable signal, the data enable signal representing a horizontal screen display region and a vertical screen display region.

In one embodiment, the frame rate conversion apparatus further comprises a vertical synchronization signal masking unit that outputs a masked vertical synchronization signal by disable-masking a frame of every several frames of the vertical synchronization signal in response to the masking enable signal.

In another embodiment, one of the masked data enable signal and the masked vertical synchronization signal controls a driving circuit to prevent a display device from displaying the disable-masked frames.

In another embodiment, the frame calculator receives an external frame rate information signal, calculates a difference between the frame rate indicated by the frame rate information signal and a frame rate indicated by the frame count signal, and generates the masking enable signal using the difference, the frame rate information signal containing information regarding the frame rate of an image signal a frame rate of which will be down converted.

In another embodiment, the data enable signal is obtained by performing an AND operation on a horizontal data enable signal representing the horizontal screen display region and a vertical data enable signal representing the vertical screen display region.

In another embodiment, the horizontal data enable signal is enabled in a period with a predetermined active duration measured from a predetermined starting point of a signal obtained by counting pulse transitions of the horizontal synchronization signal, and the vertical data enable signal is enabled in a period with a predetermined active duration measured from a predetermined starting point of a signal obtained by counting pulse transitions of the vertical synchronization signal.

In another aspect of the present invention, a display system is provided comprising: a synchronization detector that detects a horizontal synchronization signal and a vertical synchronization signal from an external synchronization signal; a frame rate conversion unit that generates a masked signal, a frame of every several frames of which is disable-masked, using the horizontal and vertical synchronization signals; a driving circuit unit that receives an external image signal, that processes the image signal according to predetermined display specifications, and that outputs the processed image signal only when the masked signal is enabled; and a display device that displays the image signal output from the driving circuit unit.

In one embodiment, the frame rate conversion unit comprises: a frame counter that generates a frame count signal from the vertical synchronization signal; a frame calculator that generates a masking enable signal using the frame count signal; and an enable signal generator that outputs a masked data enable signal as the masked signal by disable-masking a frame of every several frames of a data enable signal in response to the masking enable signal, the data enable signal representing a horizontal screen display region and a vertical screen display region.

In another embodiment, the frame rate conversion unit further comprises a vertical synchronization signal masking unit that outputs a masked vertical synchronization signal as the masked signal by disable-masking a frame of every several frames of the vertical synchronization signal in response to the masking enable signal.

In another embodiment, the frame calculator receives an external frame rate information signal which contains information regarding the image signal a frame rate of which will be down converted, calculates a difference between a frame rate indicated by the frame rate information signal and a frame rate indicated by the frame count signal, and generates the masked enable signal, a frame of every several frames of which is disable-masked, using the difference.

In another aspect of the present invention, a frame rate conversion method is provided comprising: generating a frame count signal from a vertical synchronization signal; generating a masking enable signal using the frame count signal; and outputting a masked data enable signal by disable-masking a frame of every several frames of a data enable signal in response to the masking enable signal, the data enable signal representing a horizontal screen display region and a vertical screen display region.

In one embodiment, the frame rate conversion method further comprises outputting a masked vertical synchronization signal by disable-masking a frame of every several frames of the vertical synchronization signal in response to the masking enable signal.

In another embodiment, one of the masked data enable signal and the masked vertical synchronization signal controls a driving circuit to prevent a display device from displaying the disable-masked frames.

In another embodiment, the generating of the masking enable signal comprises: receiving an external frame rate information signal which contains information regarding an image signal a frame rate of which will be down converted; calculating a difference between a frame rate indicated by the frame rate information signal and a frame rate indicated by the frame count signal; and generating the masking enable signal, a frame of every several frames of which are disabled, using the difference.

In another embodiment, the data enable signal is obtained by performing an AND operation on a horizontal data enable signal representing the horizontal screen display region and a vertical data enable signal representing the vertical screen display region.

In another embodiment, the horizontal data enable signal is enabled in a period with a predetermined active duration measured from a predetermined starting point of a signal obtained by counting pulse transitions of the horizontal synchronization signal, and the vertical data enable signal is enabled in a period with a predetermined active duration measured from a predetermined starting point of a signal obtained by counting pulse transitions of the vertical synchronization signal.

In another aspect of the present invention, a display method comprises: detecting a horizontal synchronization signal and a vertical synchronization signal from an external synchronization signal; generating a masked signal, a frame of every several frame of which are disable-masked, using the horizontal and vertical synchronization signals; receiving an external image signal, processing the image signal according to predetermined display specifications, and outputting the processed image signal only when the masked signal is enabled; and displaying the output image signal.

In one embodiment, the outputting of the masked signal comprises: generating a frame count from using the vertical synchronization signal; generating a masking enable signal using the frame count signal; and outputting a masked data enable signal as the masked signal by disable masking a frame of every several frames of a data enable signal in response to the masking enable signal, the data enable signal representing a horizontal screen display region and a vertical screen display region.

In another embodiment, the outputting of the masked signal further comprises outputting a masked vertical synchronization signal as the masked signal by disable-masking a frame of every several frames of the vertical synchronization signal in response to the masking enable signal.

In another embodiment, the generating of the masking enable signal comprises: receiving an external frame rate information signal which contains information regarding the image signal a frame rate of which will be down converted; calculating a difference between a frame rate indicated by the frame rate information signal and a frame rate indicated by the frame count signal; and generating the masked enable signal, a frame of every several frames of which are disable, using the difference.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference the accompanying drawings. Like reference numerals are used to designate like or equivalent elements throughout the disclosure.

Figure 6:
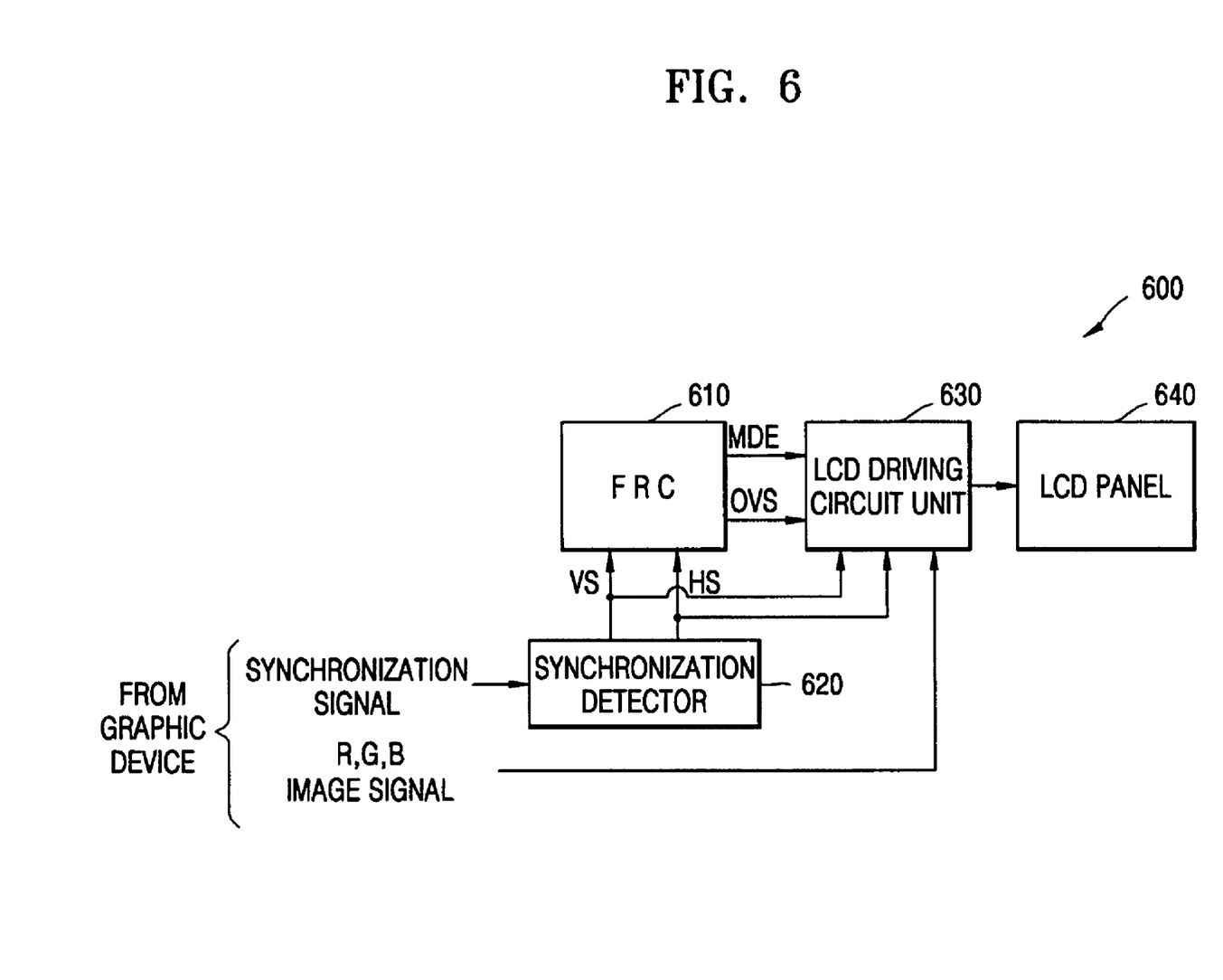
FIG. 6 is a block diagram of a display system according to an embodiment of the present invention.

FIG. 6 is a block diagram of a display system 600 according to an embodiment of the present invention. The display system 600 includes a frame rate conversion unit 610, a synchronization detector 620, an LCD driving circuit unit 630, and an LCD panel 640. However, the present invention is not limited to including an LCD driving circuit unit 630 that displays images on an LCD panel 640. For instance, the display system 600 may instead include a driving circuit unit that displays images on a display panel such as a Plasma Display Panel (PDP).

The frame rate conversion unit 610 is capable of performing frame rate down conversion without an external memory or a device that controls the external memory. In particular, the display system 600 is designed to perform frame rate down conversion even in the case where the frame rate is locked, i.e., when variation of the frequency of an external synchronization signal is not required.

The display system 600 receives a three-color image signal, i.e., an R.G.B signal, and a synchronization signal from an external device (not shown). These signals may be, for example, signals output from a graphic card of a computer or a video player, or TV signals.

The synchronization detector 620 detects a horizontal synchronization signal HS and a vertical synchronization signal VS from externally received synchronization signals. The horizontal synchronization signal HS and the vertical synchronization signal VS are input to both the frame rate conversion unit 610 and the LCD driving circuit unit 630.

The LCD panel 640 displays images at a vertical frequency or frame rate of about 60±5 KHz, for example. The frame rates of the signals output from the graphic card of the computer and the video player, and the TV signal, which are input to the display system 600, may be greater than a frame rate permitted in the LCD panel 640. In this case, the frame rate conversion unit 610 performs frame rate down conversion. The LCD panel 640 displays images at a predetermined frame rate and is also capable of displaying a Picture-In-Picture (PIP) screen with a different frame rate in the screen with the predetermined frame rate. For instance, to display a PIP screen with a frame rate of 60 Hz in a screen with a frame rate of 75 Hz, the frame rate of a part of the screen with the frame rate of 75 Hz must be converted to 60 Hz. In this case, the frame rate conversion unit 610 is required for frame rate down conversion.

When displaying an image signal after converting down the frame rate thereof, or an image signal whose frame rate is greater than a frame rate supported by the LCD panel 640, the frame rate conversion unit 610 generates masked signals MDE and OVS by disabling one of every predetermined number of frames using the horizontal and vertical synchronization signals HS and VS without changing the frequency of the external synchronization signal. Thus, it is possible to display the image signal at a frame rate lower than that of the vertical synchronization signal VS detected by the synchronization detector 620 using the masked signals MDE and OVS without changing the frequencies of the horizontal and vertical synchronization signals HS and VS. An image signal whose frame rate is greater than that supported by the LCD panel 640 may be input to the display system 600 from an external device (not shown) such as a graphic card of a computer. The frame rate conversion unit 610 will be described below in greater detail with reference to FIGS. 7 and 8.

The LCD driving circuit unit 630 receives an external image signal and processes it according to display specifications required by the LCD panel 640. The processed image signal is output to the LCD panel 640 only when the masked signals MDE and OVS are enabled. Also, the LCD driving circuit unit 630 generates power, a gamma voltage, and control signals required by the LCD panel 640, and provides them to the LCD panel 640. Under control of the LCD driving circuit unit 630, the LCD panel 640 displays the processed image signal output by the LCD driving circuit unit 630.

Figure 7:
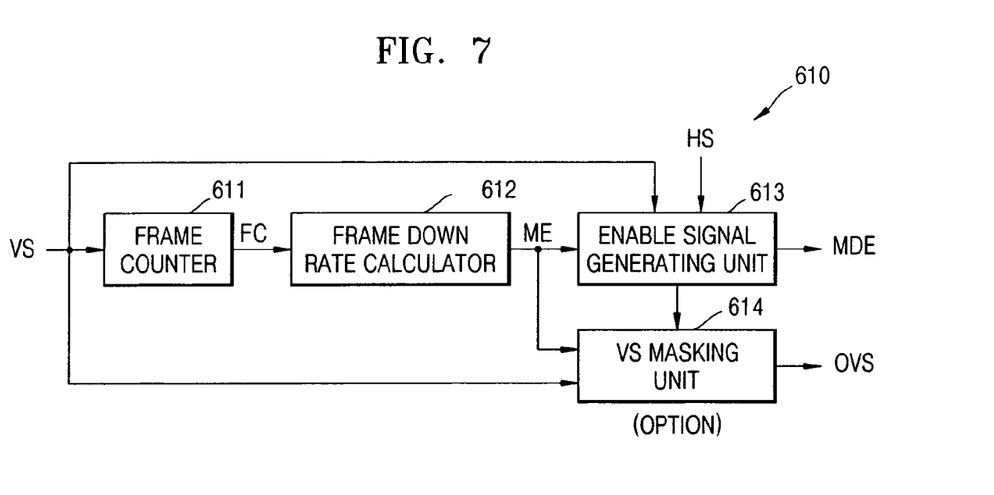
FIG. 7 is a detailed block diagram of the frame rate conversion unit of FIG. 6.

FIG. 7 is a detailed block diagram of the frame rate conversion unit 610 of FIG. 6. Referring to FIG. 7, the frame rate conversion unit 610 includes a frame counter 611, a frame down rate calculator 612, an enable signal generating unit 613, and a vertical synchronization (VS) masking unit 614.

The frame counter 611 counts the periods or a number of times that the logic level of the vertical synchronization signal VS detected by the synchronization detector 620 is changed, and generates a frame count signal FC indicating the counted periods or number of times.

The frame down rate calculator 612 generates a masking enable signal ME using the frame count signal FC. As described with reference to FIG. 4, an output data enable signal DE goes high when both a vertical data enable signal VDE and a horizontal data enable signal HDE are at a logic high level. When the output data enable signal DE is at a logic high level, the LCD driving circuit unit 140 operates to display images on the LCD panel 640. According to an embodiment of the present invention, the LCD driving circuit unit 630 is controlled by a masked data enable signal MDE illustrated in FIG. 9A. The masked data enable signal MDE is obtained from a combination of the masking enable signal ME and a data enable signal ODE that is not masked. The masking enable signal ME is used to disable a frame of every predetermined number of frames of the data enable signal ODE. Specifically, when displaying an image signal with a frame rate greater than supported by the LCD panel 640, it is possible to prevent some of the frames of the image signal from being transmitted from the LCD driving circuit 630 to the LCD panel 640 by disabling some of the frames of the data enable signal ODE, thereby creating an effect of converting down the frame rate of the input signal. Referring back to FIG. 5, when the frequency of an input frame is 75 Hz and the frequency of an output frame is 60 Hz, a frame of every five frames of the masked data enable signal MDE is disabled to be at a logic low level. Thus, during the periods of the disabled frames of the masked data enable signal MDE, the corresponding frames of the image signal are not transmitted from the LCD driving circuit unit 140 to the LCD panel 640.

The frame down rate calculator 612 receives a signal containing information regarding the frame rate of the image signal to be converted down from an external controller (not shown) such as a Micro-Control Unit (MCU), so as to generate the making enable signal ME used to convert the frame rate of an image signal and display the image signal or display an image signal whose frame rate is greater than that supported by the LCD panel 640. It is assumed that the frame rate of an external image signal is converted down and the external image signal is displayed on the LCD panel 640, under the control of the external controller. The frame down rate calculator 612 calculates the difference between the frame rate indicated in the frame rate information signal and the frame rate of the frame count signal FC output from the frame counter 611, and generates the masking enable signal ME in which a frame of every predetermined number of frames is disabled, using the difference.

Figure 8:
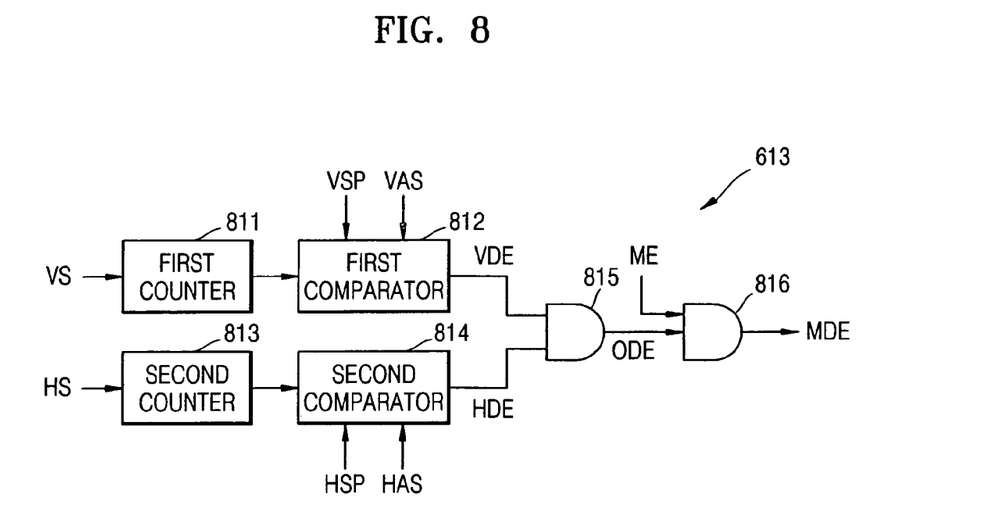
FIG. 8 is a detailed block diagram of the data enable signal generating unit of FIG. 7.

FIG. 8 is a detailed block diagram of the enable signal generating unit 613 of FIG. 7. Referring to FIG. 8, the enable signal generating unit 613 includes a first counter 811, a first comparator 812, a second counter 813, a second comparator 814, a first AND logic circuit 815, and a second AND logic circuit 816. The relationship between the data enable signal ODE that represents horizontal and vertical screen display regions, and the masked data enable signal MDE, which are generated by the enable signal generating unit 613, will be described with reference to FIGS. 9A and 9B.

The enable signal generating unit 613 generates the masked data enable signal MDE by disable-masking a frame of every several frames of the data enable signal ODE in response to the making enable signal ME. In other words, the masked data enable signal MDE is also at a logic low level when a frame of every several frames of the masking enable signal ME is at a logic low level.

For disable masking, the first counter 811 receives the vertical synchronization signal VS detected by the synchronization detector 620 of FIG. 6, counts the pulse transitions of the horizontal synchronization signal HS using a system clock signal (not shown) to determine the period of the vertical synchronization signal VS, and outputs a vertical count signal. The vertical count signal may be reset at a time of every period of the vertical synchronization signal VS. The first comparator 812 receives a vertical start position information signal VSP and a vertical active size information signal VAS from the external controller such as a MCU, and generates a vertical data enable signal VDE. The vertical data enable signal VDE is enabled, i.e., it goes high, in a period with a length, indicated by the vertical active size information signal VAS and measured from the starting point of the vertical count signal indicated by the vertical start position information signal VSP.

The second counter 813 receives the horizontal synchronization signal HS detected by the synchronization detector 620, counts pulse transitions of the system clock signal to determine the period of the horizontal synchronization signal HS, and outputs a horizontal count signal. The horizontal count signal may be reset at a time of every period of the horizontal synchronization signal HS. The second comparator 814 receives a horizontal start position information signal HSP and a horizontal active size information signal HAS from the external controller such as a MCU, and generates a horizontal data enable signal HDE. The horizontal data enable signal HDE is enabled, i.e., it goes high, in a period with a length, indicated by the horizontal active size information signal HAS and measured from the starting point of the horizontal count signal indicated by the horizontal start position information signal HSP.

Figure 9A:
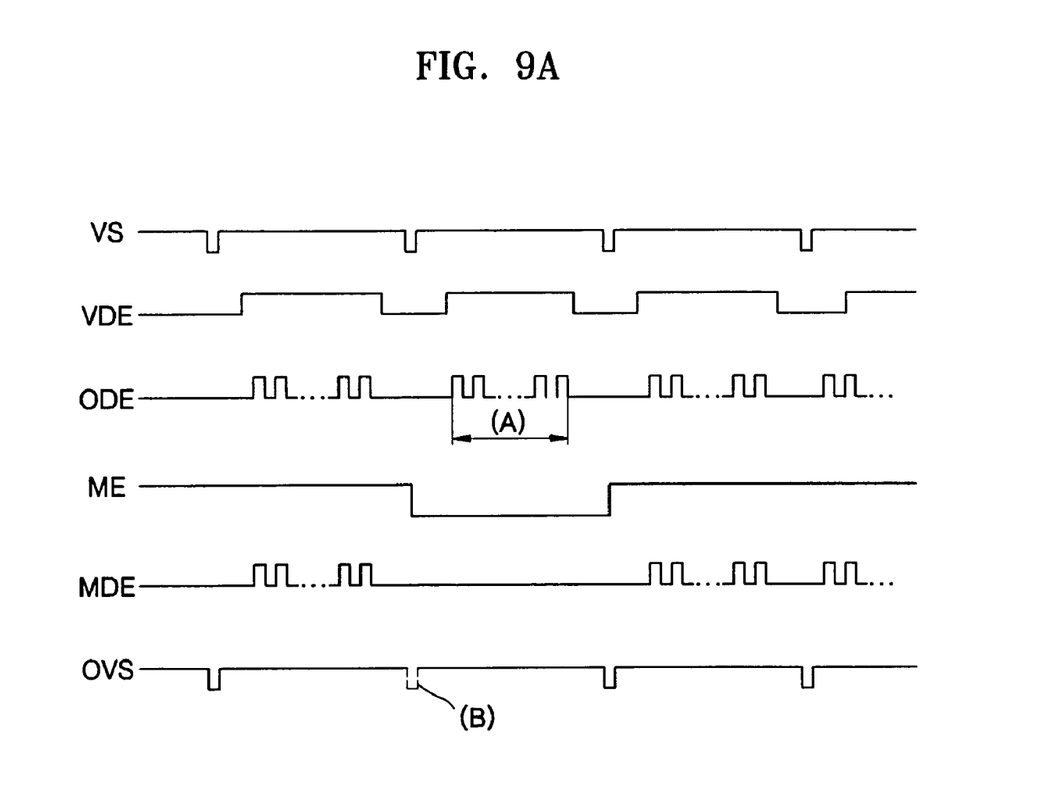
FIGS. 9A and 9B are timing diagrams of synchronization signals and data enable signals output from the frame rate conversion unit of FIG. 6.
Figure 9B:
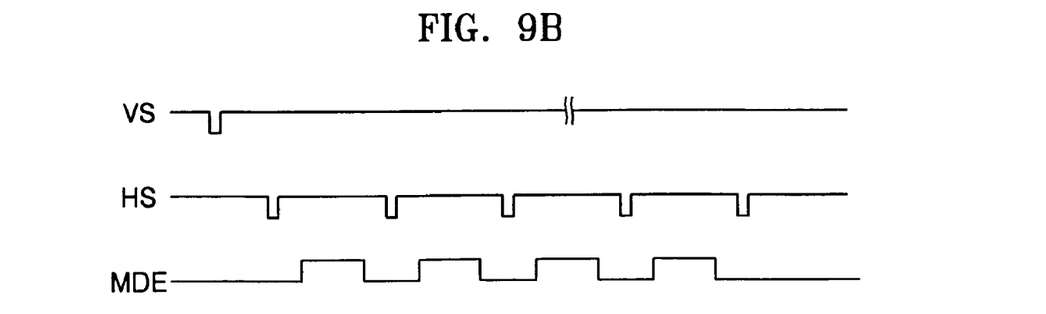

As described above with reference to FIG. 3, an image is displayed on the LCD panel 640 when both the horizontal data enable signal HDE representing a horizontal screen display region and the vertical data enable signal VDE representing a vertical screen display region are at logic high level. In this connection, the data enable signal ODE output from the first AND logic circuit 815 goes high, when both the vertical data enable signal VDE and the horizontal data enable signal HDE are at a logic high level. The second AND logic circuit 816 performs an AND operation on the masking enable signal ME generated by the frame down rate calculator 612 of FIG. 7 and the data enable signal ODE, and outputs the masked data enable signal MDE. The masked data enable signal MDE has a disable frame duration in which it is at a logic low level for every several frames thereof, indicated by (A) of FIG. 9A. When the frequency of an input frame is 75 Hz and the frequency of an output frame is 60 Hz, the masked data enable signal MDE is disabled, i.e., it goes low, for one frame of every five frames of the masked data enable signal MDE. FIG. 9B is an expanded timing diagram of the vertical synchronization signal VS and the masked data enable signal MDE of FIG. 9A, and the horizontal synchronization signal HS.

Accordingly, the masked data enable signal MDE is input to the LCD driving circuit unit 630 of FIG. 6 to convert down the frame rate of an image signal and display the image signal. The image signal corresponding to a disabled frame of the masked data enable signal MDE, indicated by (A) of FIG. 9A, is not transmitted form the LCD driving circuit unit 630 to the LCD panel 640. In general, image signals corresponding to all the frames are transmitted to the LCD panel 640 in a normal node, in response to the data enable signal ODE which is not masked.

The VS masking unit 614 is optional, that is, it is required when the LCD driving circuit unit 630 of FIG. 6 operates in response to both the vertical synchronization signal VS and the data enable signals ODE and MDE. Specifically, in order to convert down the frame rate of an image and display the image signal, the VS masking unit 614 outputs the masked vertical synchronization signal OVS by disable masking a frame of every several frames of the vertical synchronization signal VS in response to the masking enable signal ME. The masked vertical synchronization signal OVS has a disable frame duration in which the masked vertical synchronization signal OVS is at a logic high level for every several frames thereof, indicated by (B) of FIG. 9A. For instance, when the frequency of an input frame is 75 Hz and the frequency of an output frame is 60 Hz, the masked vertical synchronization signal OVS is disabled for a frame of every five frames. Therefore, in order to convert down the frame rate of an image signal and display the image signal, the masked vertical synchronization signal OVS is input to the LCD driving circuit unit 630 so that an image signal corresponding to a disabled frame of the masked vertical synchronization signal OVS is not transmitted from the LCD driving circuit unit 630 to the LCD panel 640. In this case, the masking data enable signal ODE or the masked data enable signal MDE may be input to the LCD driving circuit unit 630. In general, image signals corresponding to all frames are transmitted to the LCD panel 640 in a normal mode, in response to the vertical synchronization signal VS that is not masked.

As described above, even when the frequencies of an input synchronization signal and an output synchronization signal are locked to a frame rate, the display system 600 is capable of converting down the frame rate of an image signal by disable masking the data enable signal MDE or the masked vertical synchronization signal OVS and outputting the masked data enable signal ODE or vertical synchronization signal VS to the LCD driving circuit unit 630 using the frame rate conversion unit 610, thereby canceling some of the frames of the image signal.

Therefore, a display system according to the present invention does not require a controller or a memory for frame rate down conversion, thereby simplifying circuit construction and reducing manufacture costs. For this reason, the display system is suitable as a low-price LCD display system that requires frame rate down conversion.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A frame rate conversion apparatus comprising:
a frame counter that counts periods of a vertical synchronization signal and that generates a frame count signal corresponding to the counted periods of the vertical synchronization signal;
a frame down rate calculator that generates a masking enable signal in response to the frame count signal; and
an enable signal generator that masks an enabled frame of a data enable signal in response to the masking enable signal, the data enable signal being active when both a vertical data enable signal and a horizontal data enable signal are active, and that outputs a masked data enable signal corresponding to the data enable signal in which a frame of every several frames of the data enable signal is disable-masked.

2. The frame rate conversion apparatus of claim 1, further comprising a vertical synchronization signal masking unit that outputs a masked vertical synchronization signal by disable-masking a frame of every several frames of the vertical synchronization signal in response to the masking enable signal.

3. The frame rate conversion apparatus of claim 2, wherein one of the masked data enable signal and the masked vertical synchronization signal controls a driving circuit to prevent a display device from displaying the disable-masked frames.

4. The frame rate conversion apparatus of claim 1, wherein the frame down rate calculator receives an external frame rate information signal, calculates a difference between the frame rate indicated by the frame rate information signal and a frame rate indicated by the frame count signal, and generates the masking enable signal using the difference, the frame rate information signal containing information regarding the frame rate of an image signal frame rate of which will be down converted.

5. The frame rate conversion apparatus of claim 1, wherein the data enable signal is obtained by performing an AND operation on a horizontal data enable signal representing the horizontal screen display region and a vertical data enable signal representing the vertical screen display region.

6. The frame rate conversion apparatus of claim 5, wherein the horizontal data enable signal is enabled in a period with a predetermined active duration measured from a predetermined starting point of a signal obtained by counting pulse transitions of the horizontal synchronization signal, and
the vertical data enable signal is enabled in a period with a predetermined active duration measured from a predetermined starting point of a signal obtained by counting pulse transitions of the vertical synchronization signal.

7. A display system comprising:
a synchronization detector that detects a horizontal synchronization signal and a vertical synchronization signal from an external synchronization signal;
a frame rate conversion unit that generates a masked signal, a frame of every several frames of which is disable-masked, using the horizontal and vertical synchronization signals;
a driving circuit unit that receives an external image signal, that processes the image signal according to predetermined display specifications, and that outputs the processed image signal only when the masked signal is enabled; and
a display device that displays the image signal output from the driving circuit unit, wherein the frame rate conversion unit comprises:
a frame counter that counts periods of the vertical synchronization signal and that generates a frame count signal corresponding to the counted periods of the vertical synchronization signal;
a frame down rate calculator that generates a masking enable signal in response to the frame count signal; and
an enable signal generator that masks an enabled frame of a data enable signal in response to the masking enable signal, the data enable signal being active when both a vertical data enable signal and a horizontal data enable signal are active, and that outputs a masked data enable signal corresponding to the data enable signal in which a frame of every several frames of the data enable signal is disable-masked.

8. The display system of claim 7, wherein the frame rate conversion unit further comprises a vertical synchronization signal masking unit that outputs a masked vertical synchronization signal as the masked signal by disable-masking a frame of every several frames of the vertical synchronization signal in response to the masking enable signal.

9. The display system of claim 7, wherein the frame calculator receives an external frame rate information signal which contains information regarding the image signal a frame rate of which will be down converted, calculates a difference between a frame rate indicated by the frame rate information signal and a frame rate indicated by the frame count signal, and generates the masked enable signal, a frame of every several frames of which is disable-masked, using the difference.

10. A frame rate conversion method comprising:
counting periods of a vertical synchronization signal;
generating a frame count signal corresponding to the counted periods of the vertical synchronization signal;
generating a masking enable signal in response to the frame count signal;
masking an enabled frame of a data enable signal in response to the masking enable signal, the data enable signal being active when both a vertical data enable signal and a horizontal data enable signal are active; and
outputting a masked data enable signal corresponding to the data enable signal in which a frame of every several frames of the data enable signal is disable-masked.

11. The frame rate conversion method of claim 10, further comprising outputting a masked vertical synchronization signal by disable-masking a frame of every several frames of the vertical synchronization signal in response to the masking enable signal.

12. The frame rate conversion method of claim 11, wherein one of the masked data enable signal and the masked vertical synchronization signal controls a driving circuit to prevent a display device from displaying the disable-masked frames.

13. The frame rate conversion method of claim 10, wherein the generating of the masking enable signal comprises:
receiving an external frame rate information signal which contains information regarding an image signal a frame rate of which will be down converted;
calculating a difference between a frame rate indicated by the frame rate information signal and a frame rate indicated by the frame count signal; and
generating the masking enable signal, a frame of every several frames of which are disabled, using the difference.

14. The frame rate conversion method of claim 10, wherein the data enable signal is obtained by performing an AND operation on a horizontal data enable signal representing the horizontal screen display region and a vertical data enable signal representing the vertical screen display region.

15. The frame rate conversion method of claim 14, wherein the horizontal data enable signal is enabled in a period with a predetermined active duration measured from a predetermined starting point of a signal obtained by counting pulse transitions of the horizontal synchronization signal, and
the vertical data enable signal is enabled in a period with a predetermined active duration measured from a predetermined starting point of a signal obtained by counting pulse transitions of the vertical synchronization signal.

16. A display method comprising:
detecting a horizontal synchronization signal and a vertical synchronization signal from an external synchronization signal;
generating a masked signal, a frame of every several frame of which are disable-masked, using the horizontal and vertical synchronization signals;
receiving an external image signal, processing the image signal according to predetermined display specifications, and outputting the processed image signal only when the masked signal is enabled; and
displaying the output image signal, wherein the outputting of the masked signal comprises:
counting periods of the vertical synchronization signal;
generating a frame count signal corresponding to the counted periods of the vertical synchronization signal;
generating a masking enable signal in response to the frame count signal;
masking an enabled frame of a data enable signal in response to the masking enable signal, the data enable signal being active when both a vertical data enable signal and a horizontal data enable signal are active; and
outputting a masked data enable signal corresponding to the data enable signal in which a frame of every several frames of the data enable signal is disable-masked.

17. The display method of claim 16, wherein the outputting of the masked signal further comprises outputting a masked vertical synchronization signal as the masked signal by disable-masking a frame of every several frames of the vertical synchronization signal in response to the masking enable signal.

18. The display method of claim 16, wherein the generating of the masking enable signal comprises:
receiving an external frame rate information signal which contains information regarding the image signal a frame rate of which will be down converted;
calculating a difference between a frame rate indicated by the frame rate information signal and a frame rate indicated by the frame count signal; and
generating the masked enable signal, a frame of every several frames of which are disable, using the difference.

* * * * *